Nov. 28, 1944. M. YELLIN 2,363,826
METHOD AND MACHINE FOR FORMING PLASTIC SPIRALS
Filed March 19, 1942 3 Sheets-Sheet 1
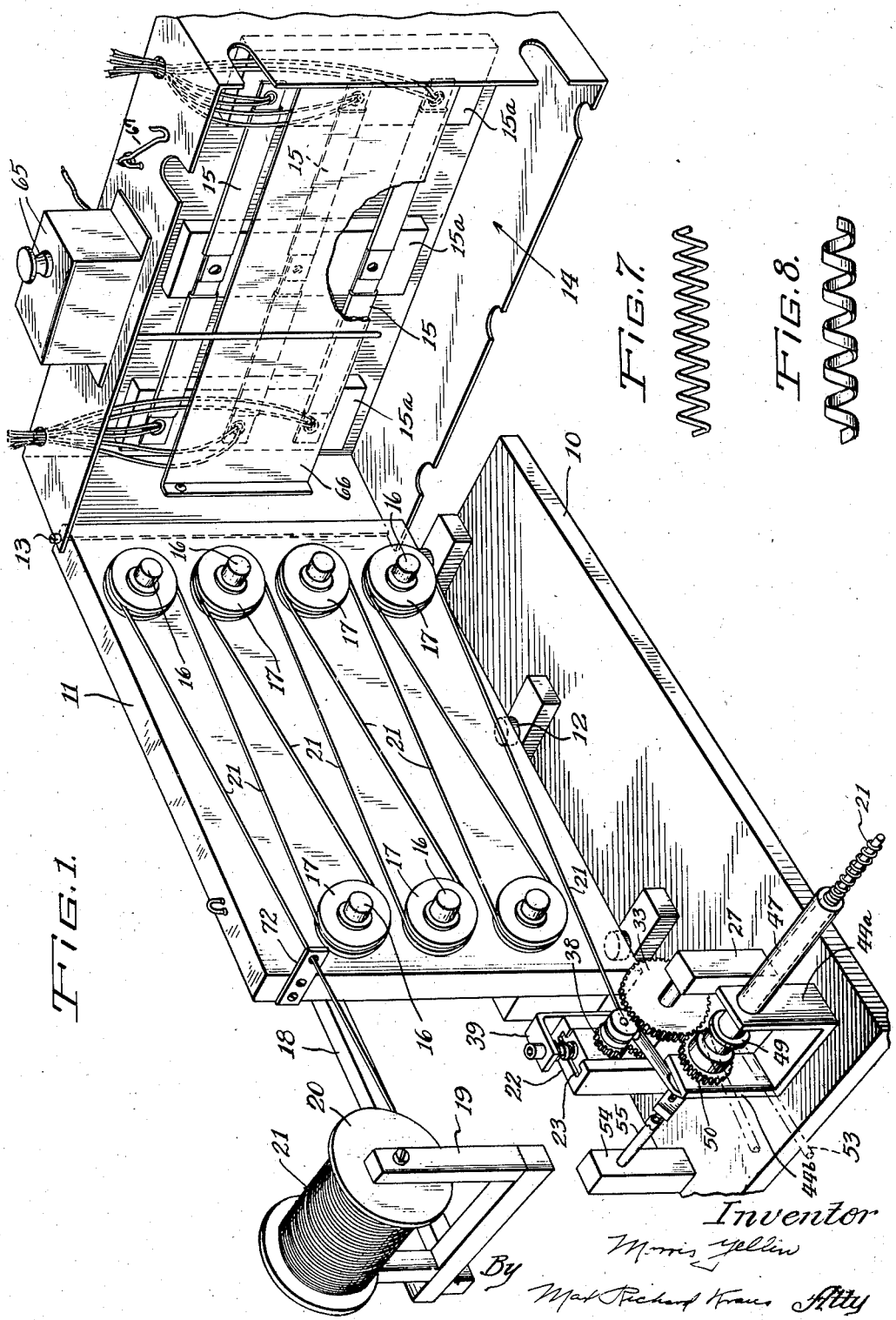

Nov. 28, 1944.  M. YELLIN  2,363,826
METHOD AND MACHINE FOR FORMING PLASTIC SPIRALS
Filed March 19, 1942  3 Sheets-Sheet 2
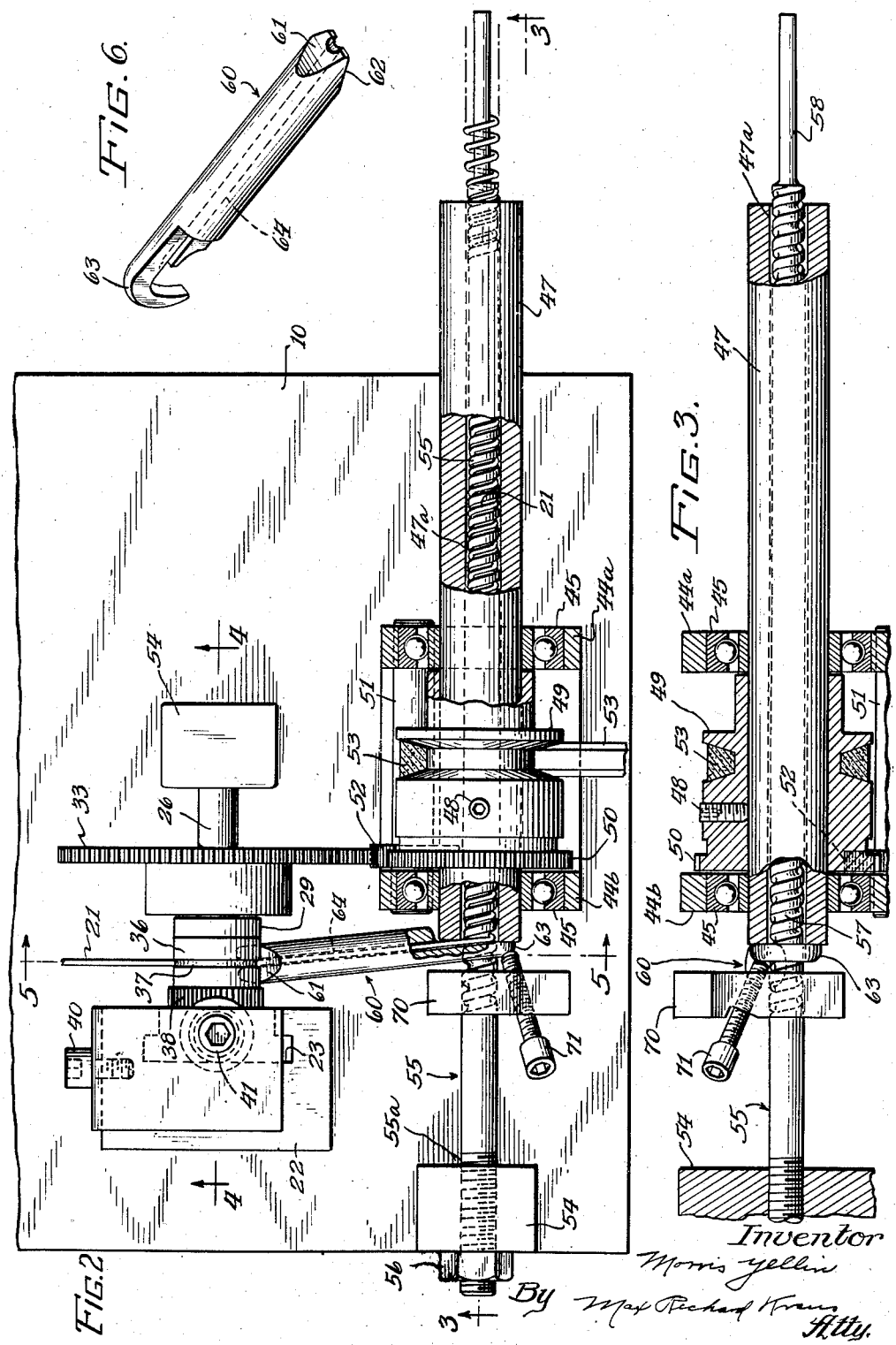
Inventor
Morris Yellin
By Max Richard Kraus
Atty.

Nov. 28, 1944.  M. YELLIN  2,363,826
METHOD AND MACHINE FOR FORMING PLASTIC SPIRALS
Filed March 19, 1942  3 Sheets-Sheet 3

Inventor
Morris Yellin
By Max Richard Kraus Atty

Patented Nov. 28, 1944

2,363,826

UNITED STATES PATENT OFFICE 2,363,826

METHOD AND MACHINE FOR FORMING PLASTIC SPIRALS

Morris Yellin, Chicago, Ill.

Application March 19, 1942, Serial No. 435,425

4 Claims. (Cl. 18—5)

This invention relates to a method and machine for forming plastic spirals.

One of the objects is to provide means for readily forming a spiral or helix of plastic material which may be used as a binder or the like or wherever spirals or helixes are used.

Another object is to provide means for forming a plastic spiral in an inexpensive and efficient manner.

Another object is to provide a machine and method which will automatically, continuously and at a rapid rate of speed unwind the extruded plastic material from its holder, heat it to proper temperature as it is advancing then wind it to form a continuous spiral.

Another object is to provide a machine which can be readily changed to form plastic spirals of any desired pitch or circumference as well as spirals from extruded plastic materials which in transverse cross section are either round, flat or other desired shape.

In the drawings:

Fig. 1 is a perspective view of the machine forming this invention and showing the heating compartment moved away from the plate member.

Fig. 2 is a plan view partially in cross section showing the spiral forming apparatus.

Fig. 3 is a view taken on line 3—3 of Fig. 2.

Fig. 6 is a perspective view of the guide finger.

Fig. 7 is a side elevational view of the spiral formed with this machine, and,

Fig. 8 is a side elevational view of a flat type of spiral that can be formed with the machine.

Figure 4:
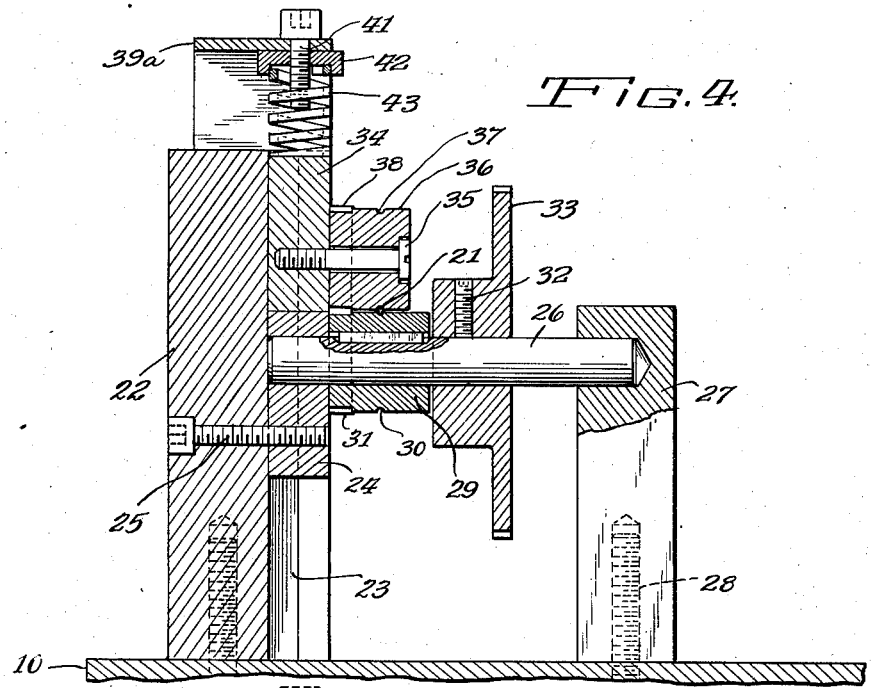
Fig. 4 is a cross sectional view taken on line 4—4 of Fig. 2.
Figure 5:
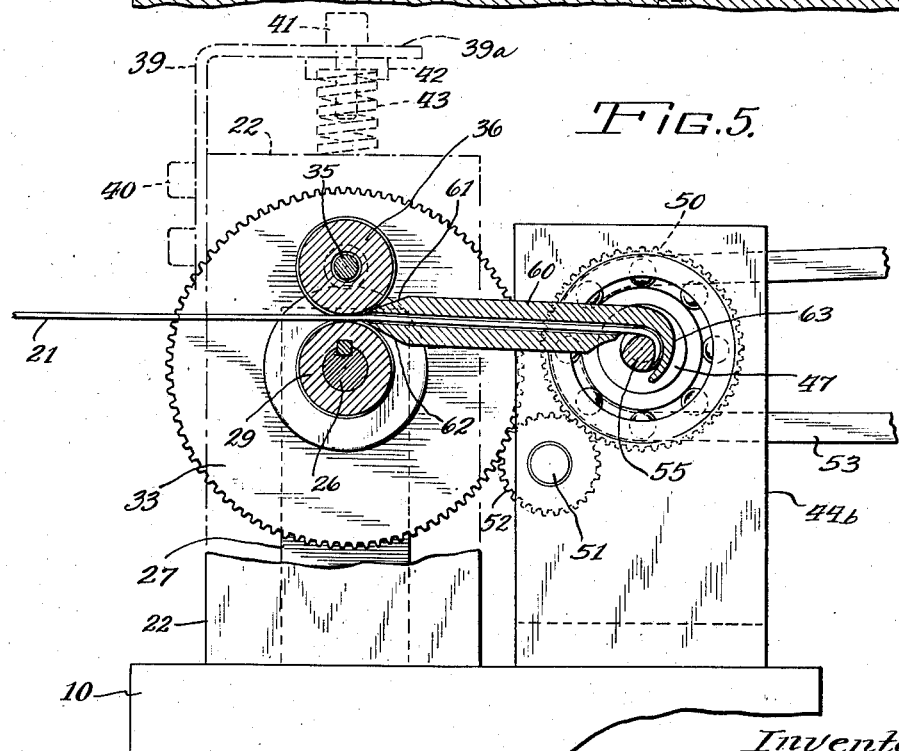
Fig. 5 is an elevational view taken on line 5—5 of Fig. 2.

The machine has a base 10 with an upright metal plate or block 11 secured to said base as at 12. Hingedly secured to the plate as at 13 is a housing generally indicated at 14 within which is supported the electrical heating elements generally indicated at 15, mounted on insulating members 15a.

Supported on suitable shafts 16 on the plate 11 in staggered relation are grooved guide wheels 17 which are freely rotatable about their shafts. The wheels are positioned adjacent the opposite ends of the plate to provide the maximum travel distance for the extruded strand of plastic material through the heated area to be described.

An arm 18 is secured to the plate 11 and this arm supports a U shaped member 19 which receives and supports a spool 20 of extruded plastic material 21.

Positioned forwardly of the plate 11 and secured to the base 10 is a block 22 which is vertically channelled as at 23. Supported within the channel 23 is an end bearing 24 which is secured to the block 22 by a threaded bolt 25. The bearing 24 supports one end of the shaft 26. The opposite end of the shaft is supported in a bearing block 27 which in turn is secured to the base 10 by a threaded bolt 28. Fixedly mounted on the shaft 26 is a roller 29 which has an annular groove 30. One end of the roller is provided with gear teeth 31. Fixedly mounted on the shaft 26 as by a set screw 32 is a gear 33. Slidably mounted in the block 22 is a block 34 which through a shaft 35 rotatably supports a roller 36. This roller has an annular groove 37 which is in alignment with the groove 30 and has teeth 38 which are in engagement with the teeth 31. A right angled bar 39 is secured to the block 22 by bolts 40 and the horizontal arm 39a of same supports a threaded bolt 41 which retains a dished washer 42. Interposed between the top of the block 34 and the washer 42 is a coiled spring 43 which maintains the block under constant pressure to maintain the rollers 29 and 36 under pressure.

Suitably secured to the base 10 is a U shaped member 44. The arms 44a and 44b of same are each provided with an opening which receive roller bearings 45. Rotatably mounted to rotate within said bearings is a sleeve 47. Secured to said sleeve by a set screw 48 is a combined pulley 49 and gear 50. Rotatably supported on a shaft 51 which is secured to the arm 44b is an intermediate gear 52 which engages the gears 33 and 50. The pulley 49 is connected by a belt 53 to a motor or other suitable source of driving power (not shown) and is driven thereby.

Supported on the base is a post 54 to which is secured an arbor or mandrel generally indicated at 55. The mandrel is secured to the post by means of its threaded end portion 55a which is engaged by a nut 56. The mandrel has a helical or spiral groove 57 substantially throughout its length and said mandrel passes into the sleeve 47 and has an extension 58 extending beyond the edge of the sleeve.

Positioned between the rollers 29—36 and the mandrel 55 is a guide finger generally indicated at 60, which has one of its ends provided with tapering portions 61 and 62 so that same can fit adjacent the two rollers 29 and 36. The opposite end of the guide finger has a hook 63 which hooks over the mandrel 55 adjacent the entrance to the sleeve 47. The member has a bore 64 and the opening of same at one end is adjacent the grooves 37 and 30 of the rollers, while at the other end it is adjacent the mandrel at the entrance of the sleeve.

A member 70 is fixedly mounted on the mandrel 55 and supports a set screw 71 which engages the hooked end 63 and serves to retain the guide finger 60 in a proper operating position, i. e., with the hooked end 63 adjacent the end of the sleeve 47.

The heating elements 15 hereinbefore referred to are all contained within the compartment 14 and may be any standard suitable electrical heating elements. It is understood that other types of heating elements may be used. The intensity of the heat may be regulated and controlled by suitable rheostat or thermostat means indicated generally at 65. A protective plate covering 66 is positioned in the compartment to the front of the heating elements. The side and bottom of the housing are provided with suitable cutout portions to permit the housing to be moved adjacent the plate 11 and locked thereto by the locking means 67 without interfering with the travel of the extruded plastic.

The operation of the machine will now be described.

The extruded strip or strand of plastic 21 which is on the spool 20 is initially threaded through an eyelet 72 and passed around the grooves of the guide wheels 17 in the order shown in Fig. 1, so that the plastic strand will travel back and forth several times across the heated area, then between the grooves 30 and 37 of the rollers 36 and 29, through the bore 64 in the guide finger 60 and the end of said strand is placed in the groove 57 of the mandrel 55 adjacent the entrance to the sleeve 47. The heating compartment 14 is moved to closed position with the heating elements proximate to the reversed strand carried on the rollers. The electrical current is turned on for imparting heat to the heating elements 15. The motor or source of power (not shown) is turned on and through the belt 53 will drive the pulley 49 which is fixed to the sleeve 47 to rotate the sleeve about the mandrel 55. Simultaneously therewith the gear 50 will be rotating which will drive the intermediate gear 52 to rotate the gear 33 in the same direction as gear 50. Rotation of the gear 33 will rotate the shaft 26 on which is secured the roller 29 which rotates therewith. Rotation of the roller 29 will through the teeth 31 and 38 rotate the roller 36. The rotation of the rollers 29 and 36 will pull the plastic strand forwardly unwinding same from its spool 20 and around the guide wheels 17 and through the grooves of the rollers 29 and 36 to feed it to the mandrel around the grooves thereof and through the sleeve to form a continuous spiral.

The rollers 29 and 36 in the first instance serve to pull the strand to the rollers and when it passes the rollers they serve to push the strand through the guide finger 60 to the grooves of the mandrel. The guide finger 60 prevents buckling of the strand. As the sleeve 47 is constantly rotating the plastic when urged into the groove of the mandrel engages the inner circumference 47a of the sleeve, rotation of the sleeve will urge the strand along the mandrel and out of the sleeve in a continuous spiral.

The heating elements 15 will heat and maintain the housing at a temperature of about 210° F. and the plastic strand passes back and forth through a sufficiently large heated area so that the plastic strand becomes sufficiently soft and pliable when it is fed into the sleeve. As it passes along the mandrel and sleeve, it sets and forms the spiral. It can be then cut in any desired lengths.

While I have shown only one type of spiral coil produced in the machine, this is only for the purpose of illustration, it being understood that spirals of any desired pitch or circumference can be produced merely by removing the mandrel 55 and substituting in lieu thereof a mandrel having grooves of a different pitch. If a larger circumference is desired a larger sleeve and a correspondingly larger mandrel can be substituted for that shown.

Other types of spiral plastic coils, such as flat strips shown in Fig. 8 can likewise be produced. If such type of spiral is desired, a flat strip of extruded material is used and a mandrel formed with grooves having a rectangular cross section is substituted for the mandrel shown in the drawings.

Various changes may be made without departing from the invention, and hence I do not limit myself to the precise details set forth, but consider myself at liberty to make such changes and alterations as fairly fall within the spirit and scope of the appended claims.

I claim:

1. The method of forming a spiral from plastic strand material which comprises, continuously withdrawing a strand of plastic material from a source of supply, rendering the strand soft and pliable after being drawn from the supply, continuously pushing the softened strand between a stationary spirally grooved mandrel and an arcuate stationary guide to shape the strand into a coil about one end of the mandrel, and thereafter confining the coil shaped strand within the groove of the mandrel while continuously feeding the same therealong and expelling the formed spiral from the mandrel.

2. In a machine of the character described, a heating chamber, a spirally grooved fixed mandrel remote from the heating chamber, a sleeve rotatable about said mandrel, a stationary arcuate guide curved about one end of the mandrel and adjacent one end of the sleeve, said guide being constructed and arranged to cooperate with the mandrel to shape the strand into a coil, means disposed between the heating chamber and mandrel for drawing a strand of plastic material from a source of supply through the heating chamber and pushing same through the stationary curved guide, the inner surface of the sleeve being cylindrical throughout its length and engageable with the strand to feed it along the grooved mandrel.

3. In a machine of the character described having opposed strand feeding rollers, a fixed spirally grooved mandrel, and a sleeve rotatable about the mandrel for feeding the strand through the groove thereof, a strand guiding finger disposed between the rollers and the mandrel, and said finger having a bore for passage of said strand and a hooked end forming an arcuate extension of one wall of the bore engageable over the mandrel adjacent one end of the sleeve.

4. The structure according to claim 3 together with adjustable means engageable with said finger to hold said hooked end adjacent the entrance end of the sleeve.

MORRIS YELLIN.